UNITED STATES PATENT OFFICE.

JACOB FRIEDMAN, OF NEW YORK, N. Y.

PROCESS OF MAKING SOLUBLE CHOCOLATE.

1,364,192.     Specification of Letters Patent.     Patented Jan. 4, 1921.

No Drawing.     Application filed April 2, 1919. Serial No. 286,999.

*To all whom it may concern:*

Be it known that I, JACOB FRIEDMAN, a citizen of the United States, residing at New York city, in the county of New York and State of New York, have invented certain new and useful Improvements in Processes of Making Soluble Chocolate, of which the following is a specification.

This invention relates to processes of preparing chocolate, and particularly to a process for the preparation of soluble chocolate.

The general object of the invention is to very much reduce the cost of preparing soluble chocolate by reducing the time required at the present time in the preparation of this material and reducing very greatly the number of machines which are necessary for its preparation.

A further object is to provide a process for making soluble chocolate which will permit flavoring matter either in a powdered or liquid form or more or less medicinal matter to be mixed intimately with the soluble chocolate.

A further object is to provide a process of making soluble chocolate which is of such character that the chocolate will not grow rancid and will be capable of being molded.

Other objects will appear in the course of the following description.

At the present time in making soluble chocolate, granulated or powdered sugar is mixed with ground cocoa bean which is known to the trade as cocoa liquor. This mixture is then refined in machines known as mixers, melangers, refiners, and conche machines. It is impossible, in the above described method, to use liquid flavoring extracts or liquid medicinal preparations, extracts, and the like, as the liquid flavoring will evaporate while the mass is passing through the highly heated machinery used for refining and mixing, and, furthermore, if liquid flavoring is used, the resultant mass cannot be molded because of the action of the moisture in the flavoring upon the fat which is mixed with or forms part of the cocoa liquor, that is the ground part of the cocoa bean. Furthermore, it requires from three to eight days to make a batch of chocolate which shall be smooth and fine. Corn syrup cannot be used in place of the sugar, inasmuch as the chocolate remains in a pasty form and cannot be molded and, furthermore, the moisture in the syrup causes the batch to become rancid very quickly. To avoid these objections and reduce the cost of the product, I have devised my improved process.

In carrying out this process, I use either corn syrup alone, or a mixture of corn syrup and sugar. Preferably, I use a mixture consisting of one-third corn syrup and two-thirds sugar. The syrup, or sugar and syrup, is boiled in vacuum pans, open steam cookers, or over open fires, in proper receptacles at a temperature of from 270° F. to 340° F., but preferably at the temperature of 310° F. The length of time during which the mass is boiled depends on the pressure used. A lower steam pressure, as of 60 lbs., requires a greater length of time than a higher pressure. Thus, where a high steam pressure of 175 lbs. is used, the mass will be boiled about eight minutes, and if at a lower steam pressure, as 60 lbs., it will be boiled one hour.

After the mass has been boiled as above described, flavoring either in powdered form or in liquid form is mixed with the mass. The material which it is desired to mix with the mass is mixed either while the mass is in the kettle or other receptacle in which it has been boiled, or after the mass has been dumped out onto a slab. In either case, the temperature goes down from the boiling temperature to a temperature of about 150°. After the material, such as flavoring or medicinal material, has been mixed with the mass, the mass is allowed to get cold and set. It is then brittle and solid and is ground into a fine powder. The proportions of the flavoring or other material which may be used with the boiled sugar or corn syrup depends upon the temperature used in boiling. Thus, for instance, if the sugar or corn syrup is boiled at a temperature of 310°, two ounces of liquid flavoring or like material may be used to each batch of the saccharine material. If it is desired to use a greater portion of flavoring, however, the material is boiled at a higher temperature.

After the boiled sugar and flavoring have set and become hard, the mass is ground up and intimately mixed with cocoa butter or cocoa liquor. This mixing operation takes place at a relatively low temperature of about 90°. This mixing takes place in the ordinary mixing and refining machines and takes a relatively short time.

By this process, I secure a soluble chocolate at a relatively low cost, as I do not use the melangers, conche machines, etc., which are required by the process used at the present time. Further, I save about 80% of the time and labor necessary by the present process and do away with the necessity of refrigeration. Furthermore, by boiling the saccharine solution at the temperature described, I thoroughly sterilize the solution, take off the scum which rises on the top of the kettle and which contains impurities, and thus the resultant product is much cleaner and more sanitary in every respect. Furthermore, all moisture is driven away by the boiling operation, thus permitting the mass to be molded and also preventing the chocolate from becoming rancid.

While the process of making soluble chocolate in use today requires from three to eight days to make a thoroughly first-class product, by my process I can secure a product ready to be placed in boxes and put on the market within two hours and with a relatively cheap plant.

While I have before particularly referred to flavoring matter as being mixed with the sugar after the latter is boiled, it is to be understood that medicinal materials such, for instance, as liquid cascara, might be mixed with the saccharine solution after boiling so as to secure a medicinal chocolate by which medicines may be taken without being tasted.

By using glucose, I eliminate the necessity of using an expensive plant, reduce the cost of production, permit the use of liquid extracts, and save fat, as by using the glucose I do not have to use so much fat. Furthermore, the use of glucose makes the melting point of the chocolate higher, whereas ordinary chocolate will not stand a temperature higher than 90° without softening. Chocolate made in accordance with this process will stand a temperature of 120°. It is to be understood that the glucose does not cheapen the product, but on the contrary, makes a better product, but it does cheapen the cost of production.

The use of granulated sugar in its raw state in the making of chocolate causes the chocolate to have a dry and granular condition or to become dry and granular as it ages, while by boiling the sugar or corn syrup the product will remain fresh and crisp for a relatively long time. While I have before referred to the use of corn syrup or a mixture of corn syrup and sugar, I wish it understood that by the term "saccharine solution" as used in the claims herewith, I wish to include syrup of any character, such as corn syrup, treacle, or molasses. I do not wish, therefore, to be limited to the particular character of the saccharine solution heretofore referred to.

I claim:—

1. A process of the character described consisting in boiling syrup, then mixing a liquid extract therewith, allowing the mass to cool and set, pulverizing the mass, and mixing the pulverized product with ground cocoa bean and fat in proportion to produce a soluble chocolate mass which may be molded and which will withstand a relatively high temperature without softening.

2. A process of the character described which consists in boiling a saccharine solution at a temperature of from 270° to 340°, allowing the mass to cool to a temperature of about 150°, and allowing the mass to grow cold and set, pulverizing the product so formed, and mixing it with ground cocoa bean and fat in proportion to produce a soluble chocolate mass which may be molded and which will withstand a relatively high temperature without softening.

3. A process of the character described comprising the boiling of a saccharine solution consisting of from one-third to two-thirds raw sugar and from two-thirds to one-third corn syrup, mixing therewith a liquid extract, allowing the mass to set and becomes cold, finely pulverizing the mass, and mixing the pulverized product with ground cocoa bean and a fat having a melting point of approximately 84° to thereby produce a soluble chocolate mass which may be molded and which will withstand a relatively high temperature without softening.

4. As an article of manufacture, a soluble chocolate mass composed of hardened and powdered syrup, finely pulverized cocoa bean, fat, and a flavoring material.

In testimony whereof I hereunto affix my signature in the presence of two witnesses.

JACOB FRIEDMAN.

Witnesses:
 FREDERIC B. WRIGHT,
 ROBERT A. BOSWELL.